(12) United States Patent
Herzig

(10) Patent No.: US 6,252,100 B1
(45) Date of Patent: Jun. 26, 2001

(54) METHOD FOR PRODUCING LINEAR ORGANOPOLYSILEXANES WITH α, ω, TERMINAL SI-LINKED ALKENYL GROUPS OR α, ω TERMINAL-LINKED HYDROGEN ATOMS

(75) Inventor: Christian Herzig, Waging am See (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/555,678

(22) PCT Filed: Dec. 8, 1998

(86) PCT No.: PCT/EP98/07966

§ 371 Date: Jun. 2, 2000

§ 102(e) Date: Jun. 2, 2000

(87) PCT Pub. No.: WO99/29762

PCT Pub. Date: Jun. 17, 1999

(30) Foreign Application Priority Data

Dec. 9, 1997 (DE) ............................. 197 54 673
Dec. 4, 1998 (DE) ............................. 198 56 075

(51) Int. Cl.$^7$ .................................................. C07R 7/08
(52) U.S. Cl. ...................... 556/450; 556/453; 528/15; 427/445
(58) Field of Search ................... 556/456, 453; 528/15; 427/445

(56) References Cited

U.S. PATENT DOCUMENTS

| | | |
|---|---|---|
| 2,476,166 | 7/1949 | Wayo . |
| 3,445,420 | 5/1969 | Kookootsedes . |
| 4,150,048 | 4/1979 | Schilling, Jr. et al. . |
| 4,504,645 | 3/1985 | Melancon . |
| 5,087,720 | 2/1992 | Kishita et al. . |
| 5,386,049 | 1/1995 | Kishita et al. . |
| 5,442,083 | 8/1995 | Kobayashi . |
| 5,504,175 | 4/1996 | Kobayashi . |
| 5,691,435 | 11/1997 | Herzig et al. . |

FOREIGN PATENT DOCUMENTS

| | | | |
|---|---|---|---|
| 1107941 | 5/1961 | (DE) . | |
| 0 414 938 A1 | 3/1991 | (EP) . | |
| 0 469 927 A2 | 2/1992 | (EP) . | |
| 469927 | * 2/1992 | (EP) | ................................... 556/450 |
| 0 549 214 A2 | 6/1993 | (EP) . | |
| 549214 | * 6/1993 | (EP) | ................................... 556/450 |
| 0 679 676 A2 | 11/1995 | (EP) . | |
| 679676 | * 11/1995 | (EP) | ................................... 556/450 |
| 0 786 463 A1 | 7/1997 | (EP) . | |
| 786463 | * 7/1997 | (EP) | ................................... 556/450 |

OTHER PUBLICATIONS

International Search Report—May 17, 1999.
English Abstract Corresponding to DE 11007941, May 31, 1961.
Chemical Abstracts, 1962, vol. 56, No. 1.
Fortschrittsberichte 1960, A.D. Petrov and V.M. Vdovin, Isv. Akad. SSSR, 1959, No. 5.
English Derwent Abstracts Ref 95–159063121 Corresponding To JP 07–082379 A.
Chemical Abstracts, 1994, vol. 121, No. 26.
English Translation For "Fortschrittsberichte 1960, A.D. Petrov and V.M. Vdovin, Isv. Akad. SSSR, 1959, No. 5".

* cited by examiner

Primary Examiner—Paul F. Shaver
(74) Attorney, Agent, or Firm—Brooks & Kushman P.C.

(57) ABSTRACT

Linear organopolysiloxanes containing alpha, omega terminal Si bonded omega-alkenyl groups or alpha, omega Si bonded H are prepared via hydrosilylation.

21 Claims, No Drawings

METHOD FOR PRODUCING LINEAR ORGANOPOLYSILEXANES WITH α, ω, TERMINAL SI-LINKED ALKENYL GROUPS OR α, ω TERMINAL-LINKED HYDROGEN ATOMS

TECHNICAL FIELD

The invention relates to a process for the preparation of linear organopolysiloxanes having α,ω-terminal Si-bonded alkenyl groups or α,ω-terminal Si-bonded hydrogen atoms.

DESCRIPTION OF THE RELATED ART

U.S. Pat. No. 5,442,083 (Dow Corning Toray Silicone; published on Aug. 15, 1995) describes a process for the preparation of linear organopolysiloxanes having α,ω-terminal Si-bonded vinyl groups or α,ω-terminal Si-bonded hydrogen atoms by reacting an α,ω-dihydrogendimethylpolysiloxane with an aliphatically unsaturated hydrocarbon having two C=C double bonds and at least three carbon atoms or with an alkyne having at least two carbon atoms in the presence of hydrosilylation catalysts.

EP-A 414 938 (Nippon Unicar Company Limited; laid open on Mar. 6, 1991) discloses a crosslinkable composition which contains a thermoplastic resin and a linear organopolysiloxane, the linear organopolysiloxane being obtained by reacting a linear organopolysiloxane having terminal Si-bonded hydrogen atoms with a linear diene having more than five carbon atoms.

U.S. Pat. No. 5,087,720 (Shin-Etsu Chemical Co.; published on Feb. 11, 1992) describes linear organopolysiloxanes having terminal Si-bonded vinyl groups, which have repeating units of the formula —(SiR$_2$—CH$_2$CH$_2$—SiR$_2$O)$_n$— in the chain. Preparation is carried out via ring-opening polymerization of a 5-membered cyclic silethylenesiloxane of the general formula

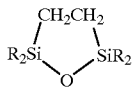

in the presence of a divinyldisiloxane. U.S. Pat. No. 5,386,049 (Shin-Etsu Chemical Co.; published on Jan. 31, 1995) discloses linear organopolysiloxanes having terminal Si-bonded hydroxyl groups or vinyl diorganosilyl groups, which have repeating units of the formula —[SiMe$_2$—(CH$_2$)$_p$—SiMe$_2$O]$_n$—(Me=methyl radical, p=10–16) in the chain.

U.S. Pat. No. 5,504,175 (Dow Corning Toray Silicone Co.; published on Apr. 2, 1996) describes linear organosilicon polymers having terminal Si-bonded hydrogen atoms or terminal Si-bonded alkenyl groups, which are obtained by reacting an asymmetric linear α-hydrogen-ω-alkenyldiorganopolysiloxane with a symmetrical linear α,ω-dihydrogendiorganopolysiloxane or α,ω-dialkenyl-diorganopolysiloxane in the presence of a hydrosilylation catalyst. This process requires an asymmetric diorganopolysiloxane whose precise preparation is complicated and expensive and hence industrially not very attractive.

SUMMARY OF THE INVENTION

It was the object to provide a process for the preparation of linear organopolysiloxanes having α,ω-terminal Si-bonded alkenyl groups or α,ω-terminal Si-bonded hydrogen atoms, which is simple, in which the formation of low molecular weight volatile or cyclic byproducts is avoided and in which the starting materials used can be easily purified. In particular, it was the object to provide a process in which aqueous emulsions which contain highly polymeric organopolysiloxanes may be prepared at all and in a simple manner.

The object is achieved by the invention.

DETAILED DESCRIPTION OF THE INVENTION

The invention relates to a process for the preparation of linear organopolysiloxanes having α,ω-terminal Si-bonded ω-alkenyl groups or α,ω-terminal Si-bonded hydrogen atoms and of the general formula

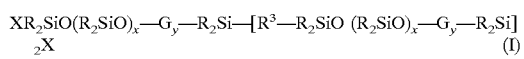

by reacting Si-bonded organopolysiloxanes having ω-alkenyl groups and of the general formula

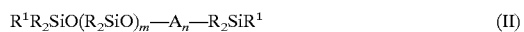

with Si-bonded organopolysiloxanes having hydrogen atoms and of the general formula

in the presence of catalysts promoting the addition of Si-bonded hydrogen at an aliphatic multiple bond, where R denotes an optionally substituted hydrocarbon radical having 1 to 18 carbon atom(s) per radical, X denotes in each case identical radicals selected from the radicals R$^1$ and R$^2$, where R$^1$ denotes an ω-alkenyl radical having 2 to 18 C atoms, R$^2$ denotes a hydrogen atom, R$^3$ is a bifunctional α,ω-alkanediyl radical having 2 to 18 C atoms, G is a radical A or B, where A is a radical of the formula

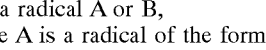

and B is a radical of the formula

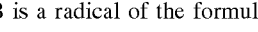

where

R$^4$ denotes a divalent hydrocarbon radical having 2 to 14 carbon atoms per radical, which may be interrupted by 1 to 4 separate oxygen atoms, m is 0 or an integer having a value of 1 to 2000, n is 0 or an integer having a value of 1 to 20, o is 0 or an integer having a value of 1 to 2000, p is 0 or an integer having a value of 1 to 20, x is m or o, y is n or p and z is an integer having a value of at least 2, preferably 5 to 20, with the proviso that the sum m+n is ≧0.

The organopolysiloxanes prepared by the process according to the invention preferably have a viscosity of 20 to 200,000,000 MM$^2$/s at 25° C., preferably 2000 to 100,000,000 mm$^2$/s at 25° C. and particularly preferably 100,000 to 20,000,000 mm$^2$/s at 25° C.

Examples of radicals R are alkyl radicals, such as the methyl, ethyl, n-propyl, isopropyl, 1-n-butyl, 2-n-butyl, isobutyl, tert-butyl, n-pentyl, isopentyl, neopentyl or tertpentyl radical; hexyl radicals, such as the n-hexyl radical; heptyl radical, such as the n-heptyl radical; octyl radicals, such as the n-octyl radical and isooctyl radicals, such as the 2,2,4-trimethylpentyl radical; cycloalkyl radicals, such as cyclopentyl, cyclohexyl and cycloheptyl radicals and methylcyclohexyl radicals; aryl radicals, such as the phenyl radical, alkaryl radicals, such as the o-, m- and p-tolyl radicals, xylyl radicals and ethylphenyl radicals, and aralkyl radicals, such as the benzyl radical and the α- and the β-phenylethyl radical. The methyl radical is preferred.

Examples of halogenated radicals R are haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radical.

Examples of radicals $R^1$ are the vinyl, allyl, 3-butenyl, 5-hexenyl, 7-octenyl, 9-decenyl and 13-tetradecenyl radical. The vinyl and the 5-hexenyl radical are preferred, and the vinyl radical is particularly preferred.

Examples of radicals Y are those of the formula —$CH_2CH_2$—, —$CH(CH_3)$—, —$(CH_2)_4$—, —$(CH_2)_5$—, —$(CH_2)_6$—$(CH_2)_8$—, —$(CH_2)_{10}$—, —$(CH_2)_{12}$—, —$(CH_2)_3O(CH_2)_3$—, 1,3-$(CH_2CH_2)_2$ $(C_6H_4)$, 1,4-$(CH_2CH_2)_2(C_6H_4)$ and 1,3-$(CH_2CHCH_3)_2(C_6H_4)$, where the radical of the formula —$CH_2CH_2$— is preferred.

m is preferably an integer having a value of 1 to 1000, preferably 10 to 1000, particularly preferably 100 to 500.

o is preferably an integer having a value of 1 to 1000, preferably 10 to 1000, particularly preferably 100 to 500.

n is preferably 0 or an integer having a value of 1 to 5; n is preferably 0.

p is preferably 0 or an integer having a value of 1 to 5; p is preferably 0.

Processes for the preparation of organopolysiloxanes of the formulae (II) and (III) are known to a person skilled in the art.

In the process according to the invention, the ratio of Si-bonded ω-alkenyl groups in organopolysiloxanes of the formula (II) to Si-bonded hydrogen atoms in organopolysiloxanes of the formula (III) which is used may vary within wide limits depending on the desired end product. In the process according to the invention, the ratio of Si-bonded ω-alkenyl groups in organopolysiloxanes of the formula (II) to Si-bonded hydrogen atoms in organopolysiloxanes of the formula (III) is preferably 100:1 to 1:100, preferably 5:1 to 1:5, particularly preferably 1.5:1 to 1:1.5, very particularly preferably 1.3:1 to 1:1.3, it being possible to obtain particularly high molecular weight products in the range 1.1:1 to 1:1.1. With a stoichiometric excess of Si-bonded ω-alkenyl groups, polymers having hydrocarbon bridges —$C_2H_4$— along the chain and one Si-bonded ω-alkenyl group each at both chain ends are obtained. Conversely, with an excess of Si-bonded hydrogen atoms, polymers having hydrocarbon bridges —$C_2H_4$— along the chain and one Si-bonded hydrogen atom each at both chain ends are obtained.

The same catalysts which have also been used to date for promoting the addition of Si-bonded hydrogen at an aliphatic multiple bond can also be used in the process according to the invention as catalysts promoting the addition of Si-bonded hydrogen at an aliphatic multiple bond. The catalysts are preferably a metal from the group consisting of the platinum metals or are a compound or a complex from the group consisting of the platinum metals.

Examples of such catalysts are metallic and finely divided platinum which may be present on supports, such as silica, alumina or active carbon, compounds or complexes of platinum, such as platinum halides, e.g. $PtCl_4$, $H_2PtCl_6.6H_2O$, $Na_2PtCl_4.4H_2$, platinum-olefin complexes, platinum-alcohol complexes, platinum-vinylsiloxane complexes, such as platinum-1,3-divinyl-1,1,3,3-tetramethyldisiloxane complexes with or without a content of detectable inorganically bonded halogen, trimethylenedipyridineplatinum dichloride, dicyclopenta-dienylplatinum dichloride, cyclooctadienylplatinum dichloride, norbornadienylplatinum dichloride and reaction products of platinum tetrachloride with olefin.

In the process according to the invention, the catalyst is preferably used in amounts of 1 to 50 ppm by weight (parts by weight per million parts by weight) or preferably in amounts of 5 to 30 ppm by weight, calculated in each case as elemental platinum and based on the total weight of the organopolysiloxanes of the formulae (II) and (III).

In the process according to the invention, the corresponding organopolysiloxanes of the formulae II and III or a mixture of the corresponding organopolysiloxanes are converted into aqueous emulsions stable over a relatively long time, by means of known, commercially obtainable emulsifiers and conventional techniques, for example with rotor-stator or dissolver stirring apparatuses, and with high pressure homogenizers.

In the process according to the invention, the catalyst can be added before or during the preparation of the emulsion, either to the organopolysiloxane of the formula II or the mixture of the organopolysiloxanes of the formulae II and III.

The formation of the organopolysiloxanes prepared according to the invention can take place during the preparation of the emulsion or in the finished emulsion.

Examples of emulsifiers used in the process according to the invention are:

Sorbitan esters of fatty acids having 10 to 22 carbon atoms; polyoxyethylene sorbitan esters of fatty acids having 10 to 20 carbon atoms and an ethylene oxide content of up to 35%; polyoxyethylene sorbitol esters of fatty acids having 10 to 22 carbon atoms; polyoxyethylene derivatives of phenols having 6 to 20 carbon atoms on the aromatic and an ethylene oxide content of up to 95%; fatty amino- and amidobetaines having 10 to 22 carbon atoms; polyoxyethylene condensates of fatty acids or fatty alcohols having 10 to 22 carbon atoms and an ethylene oxide content of up to 95%; polyvinyl alcohols having 5 to 50% of vinyl acetate units and having a degree of polymerization of from 500 to 3000;

ionic surfactants, such as alkarylsulfonates having 6 to 20 carbon atoms in the alkyl group; fatty acid soaps having 10 to 22 carbon atoms in the alkyl group; fatty acid soaps having 10 to 22 carbon atoms; fatty sulfates having 10 to 22 carbon atoms; alkanesulfonates having 10 to 22 carbon atoms; alkali metal salts with dialkyl sulfosuccinates; fatty amine oxides having 10 to 22 carbon atoms; fatty imidazolines having 6 to 20 carbon atoms; fatty amidosulfobetaines having 10 to 22 carbon atoms;

quaternary surfactants, such as fatty ammonium compounds having 10 to 22 carbon atoms; fatty morpholine oxides having 10 to 22 carbon atoms; alkali metal salts of carboxylated ethoxylated alcohols having 10 to 22 carbon atoms and up to 95% of ethylene oxide; ethylene oxide condensates of fatty acid monoesters of glycerol having 10 to 22 carbon atoms and up to 95% of ethylene oxide; mono- or diethanolamides of fatty acids having 10 to 22 carbon atoms; alkoxylated silicone surfactants having ethylene oxide and/or propylene oxide units; phosphate esters.

As is well known in the area of surfactants, the opposite ions in the case of anionic surfactants may be alkali metals, ammonia or substituted amines, such as triethylamine or triethanolamine. In the case of cationic surfactants, the opposite ion is halide, sulfate or a methylsulfate. Chlorides are the compounds most available industrially.

In the process according to the invention, an emulsifier or a mixture of two or more emulsifiers may be used.

The process according to the invention is preferably carried out at ambient atmospheric pressure, i.e. at about 1020 hPa (abs.), but it may also be carried out at higher or lower pressures. It is preferably carried out in the temperature range from 0° C. to 160° C., preferably from 20° C. to 120° C. In the case of an emulsion, this is carried out in a temperature range from 0° C. to 50° C.

In the process according to the invention, inert, organic solvents may be concomitantly used, although the concomitant use of inert, organic solvents is not preferred.

Examples of inert, organic solvents are toluene, xylene, octane isomers, butyl acetate, 1,2-dimethoxyethane, tetrahydrofuran and cyclohexane.

Furthermore, inert low molecular weight siloxanes, such as hexamethyldisiloxane, octamethyltrisiloxane or slightly higher homologs, and cyclic dialkylsiloxanes having 3 to 14 silyloxy units may be added for regulating the viscosity profile or for reasons relating to handling.

If desired for process engineering reasons, a reaction inhibitor may be added to the mixture of organopolysiloxanes of the formulae (II) and (III).

In the case of the compositions according to the invention, too, it is possible to use, as compositions which inhibit the addition of Si-bonded hydrogen at an aliphatic multiple bond at room temperature, so-called inhibitors, all inhibitors which have also been used to date for the same purpose. Examples of inhibitors are 1,3-divinyl-1,1,3,3-tetramethyldisiloxane, benzotriazole, dialkylformamides, alkylthioureas, methyl ethyl ketoxime, organic or organosilicon compounds having a boiling point of at least 25° C. at 1012 mbar (abs.) and at least one aliphatic triple bond according to U.S. Pat. No. 3,445,420, such as 1-ethynylcyclohexan-1-ol, 2-methyl-3-butin-2-ol, 3-methyl-1-pentyn-3-ol, 2,5-dimethyl-3-hexyne-2,5-diol, 3,5-dimethyl-1-hexyn-3-ol and 3,7-dimethyl-oct-1-yn-6-en-3-ol, inhibitors according to U.S. Pat. No. 2,476,166, such as a mixture of diallyl maleate and vinyl acetate, and inhibitors according to U.S. Pat. No. 4,504,645, such as monoesters of maleic acid.

Preferably, the inhibitor is used in amounts of 0.001 to 10% by weight, based on the total weight of the organopolysiloxanes, the amount of 0.005 to 0.01% by weight being preferred.

The process according to the invention can be carried out batchwise, semicontinuously or completely continuously.

The process according to the invention can also preferably take place in the presence of water in the oil phase. This may be a continuous oil phase containing water droplets or a continuous aqueous phase containing oil droplets. It may also preferably be an emulsion. This has the advantage that emulsions comprising high molecular weight organopolysiloxanes can be prepared in situ in the oil phase. It is therefore possible to prepare emulsions comprising high molecular weight organopolysiloxanes by the process according to the invention. This was previously not possible at all.

The amount of water in the emulsions prepared by the process according to the invention is preferably 30% by weight to 90% by weight, preferably 40% by weight to 70% by weight, based on the total weight of the composition.

The process according to the invention has the advantage that no low molecular weight volatile or cyclic byproducts without terminal functions are obtained and that the starting materials used, the organopolysiloxanes of the formulae (II) and (III), can, if required, be easily purified. The removal of byproducts, for example by distillation (heating in vacub), is therefore unnecessary which is advantageous in particular in the case of relatively high molecular weight organopolysiloxanes of the formula (I), which have a relatively high viscosity, since the removal of byproducts is complicated and incomplete owing to the higher viscosity of the end products.

The organopolysiloxanes of the formula (I) which are obtained by the process according to the invention are used for hydrosilylation reactions, as polymer raw materials for producing networks and for the preparation of telechels having identical or different terminal groups.

The emulsions according to the invention are used for the surface treatment of flexible materials, such as leather or artificial leather, for example of polyurethane, and rigid surfaces, such as floors of stone, artificial stone, plastics, or tiles of ceramic, earthenware or stoneware.

Application in a thin layer results in controlled slip effect.

EXAMPLE 1

870 g of an α,ω-divinyldimethylpolysiloxane having an iodine number of 41.6 are mixed at 25° C. with 67 g of 1,1,3,3-tetramethyldisiloxane, and 10 mg of platinum in the form of the 1,3-divinyltetramethyldisiloxane complex (so-called Karstedt catalyst) are added. The temperature increases first slowly and then more and more rapidly to about 56° C., after which the mixture is left at 80° C. for about one hour to continue reacting until no more Si-bonded hydrogen is detectable. Without further working up, the product contains 0.8% by weight of volatile components (2 g/1 h/180° C.) and has a viscosity of 96 mm$^2$/s at 25° C. The $^1$H NMR spectrum of the product, a linear dimethylpolysiloxane having —$C_2H_4$— bridges and terminal vinyldimethylsiloxane units, shows an SiC$_2$H$_4$Si/SiCH=CH$_2$ ratio of 2.4. The iodine number of the product is 11.4, which corresponds to an average chain length of about 60 siloxane units.

EXAMPLE 2

642 g of an α,ω-divinyldimethylpolysiloxane having an iodine number of 41.6 are mixed with 285 g of an α,ω-dihydrogendimethylpolysiloxane having 0.35% by weight of Si-bonded hydrogen, and Karstedt catalyst is then added to the homogeneous siloxane mixture in an amount such that the total batch contains 5 ppm of platinum. After heating to 120° C. for two hours, a linear polymer having —$C_2H_4$— bridges and terminal vinyldimethylsiloxane units, in which no Si-bonded hydrogen is detectable and which has only 0.8% by weight of volatile components, is obtained. The linear polymer has a viscosity of 97,000 mPa.s at 25° C. and an iodine number of 0.7.

COMPARATIVE EXPERIMENT 1

50 g of an α,ω-divinyldimethylpolysiloxane having an iodine number of 30.5 are mixed with 120 g of an α,ω-dihydroxydimethylpolysiloxane having a viscosity of 5800 mm$^2$/s at 25° C. and 5 g of aluminum sulfate and heated to about 80° C. The viscosity decreases continuously until a viscosity of 99 mm$^2$/s at 25° C. (after filtration) is reached after 5 hours. The linear polymer thus obtained and having α,ω-terminal Si-bonded vinyl groups contains 9.7% by weight of volatile components and hence more than ten times as much as the linear polymer prepared according to Example 1.

COMPARATIVE EXPERIMENT 2

Example 2 is repeated by using 98 g of 1,3-divinyltetramethyldisiloxane instead of 642 g of the medium-viscosity α,ω-divinyldimethylpolysiloxane. After heating for two hours at 120° C., only a moderate increase in viscosity occurred. Heating for a further 2 hours at 140° C. gives a polymer mixture having a viscosity of 4200 mm$^2$/s at 25° C., in which Si-bonded hydrogen is still detectable. With the disiloxane (i.e. sum m+n=0), comparatively incomplete conversions are achieved.

EXAMPLE 3

175 g of a mixture of an α,ω-dihydrogenpolydimethylsiloxane having 0.058% of Si-bonded hydrogen and an α,ω-divinylpolydimethylsiloxane having a vinyl content of 0.92% in a mass ratio of 1:1.892, having a viscosity of 116 mm$^2$/s, are stirred with 5 to 30% of the total amount of water (300 g of demineralized water) and 25 g of emulsifier Arlypon IT 10/80 (from Grunau) (Arlypon IT 10/80 corresponds to the average formula $C_{13}H_{27}O\,(C_2H_4O)_{10}H$) in a rotor-stator emulsifying apparatus (Turrax; from Janke & Kunkel) for 2 to 3 min. Thereafter, 1000 ppm of a 1% strength (based on Pt) solution of Karstedt catalyst in vinylsiloxane are incorporated for 1 to 2 min and this mixture is then diluted with the remaining water.

An emulsion having an average particle size of about 280 nm is obtained. By evaporating down the emulsion and reextracting the polysiloxane with n-heptane, a material having a high viscosity of 145,000 mpa.s and a vinyl content of 0.06% by weight is obtained.

EXAMPLE 4

The mixture (175 g) from Example 3 is mixed with 1000 ppm of the same platinum catalyst in a laboratory dissolver (from Molteni) and homogenized for 1 min., after which 25 g of emulsifier IT 10/80 and 300 g of demineralized water are added stepwise while stirring.

EXAMPLE 5

50 g of emulsifier IT 10/80 are stirred with 4 to 30% of the amount of demineralized water (600 g) and 350 g of the mixture from Example 1 in a laboratory dissolver for 1 min. Thereafter, 1000 ppm of the same Pt catalyst are stirred in for 2 min and dilution is effected stepwise with the remaining demineralized water.

EXAMPLE 6

A preemulsion prepared in the Turrax (from Janke & Kunkel) and comprising 700 g of polymer mixture, catalyzed with 1000 ppm of the same catalyst, 100 g of Arlypon IT 10/80 and 600 g of demineralized water are homogenized in a high-pressure homogenizer (LAB 60 from APV) at a pressure of 700 bar.

EXAMPLE 7

As in Example 3, 175 g of a mixture of 95.2 parts of an α,ω-dihydrogenpolydimethylsiloxane having 0.210% of Si-bonded hydrogen and 976.0 parts of α,ω-divinylpolydimethylsiloxane having a vinyl content of 0.69% are emulsified. The siloxane polymer formed is obtained by extraction in the same manner. It has a vinyl content of 0.126% at a viscosity of 18,600 mPa.s.

EXAMPLE 8

Example 3 is repeated by using a polymer mixture with 8500 mPa.s, which consists of 29.1% by weight of an α,ω-dihydrogenpolydimethylsiloxane having 0.0109% of Si-bonded hydrogen and 70.9% by weight of an α,ω-divinylpolydimethylsiloxane having an iodine number of 1.083. The reextracted polymer has a viscosity greater than $3.5 \cdot 10^7$ mPa.s. The emulsion itself exhibits no substantial creaming even after several weeks at 50° C.

EXAMPLE 9

An oil phase is inhibited with 34.5 g of the hydrogen siloxane used in Example 3 and 359.7 g of an α,ω-di-ω-hexenylpolydimethylsiloxane, prepared with 100 ppm of 1-ethynylcyclohexanol and emulsified as in Example 1. The polysiloxane reextracted after one day has an iodine number of 0.65 and a viscosity of 77,000 mpa.s.

EXAMPLE 10

Example 3 is repeated in the general context by using the same components but in the reverse stoichiometric ratio, so that an excess of Si-bonded hydrogen results. The hydrogen siloxane is therefore used in a mass ratio of 1.532 relative to the vinylsiloxane, which corresponds to a ratio of HSi groups to C=C groups of 1.11. A polymer with 169,000 mpa.s, which contains 0.0022% of Si-bonded hydrogen, can be reextracted from the emulsion obtained.

EXAMPLE 11

100 ppm of polyaddition regulator 2-methyl-3-butyn-2-ol, 2000 ppm of 1% strength platinum catalyst and 14% of the emulsifier Arlypon IT 10/80 are added to the polymer mixture used in Example 8 and comprising dihydrogen- and divinylpolydimethylsiloxane. Furthermore, 60 parts of water are added to 200 parts of this premix and the mixture is fed to a Dispax (from Janke & Kunkel).

The resulting paste is fed continuously, with the same amount of water (residual water), at a total throughput of 400 ml/min, to a second Dispax and thus converted into the siloxane polymer emulsion. The reextracted polymer has a viscosity of about $4 \cdot 10^7$ mPa.s.

COMPARATIVE EXAMPLE 3

175 g of a dimethylpolysiloxane having a viscosity of $8 \cdot 10^6$ mPa.s are stirred with 25 g of Arlypon IT 10/80 and 30% of the total amount of water of 300 g in a Turrax emulsifying apparatus for 3 minutes and then diluted with the remaining water. The useful emulsion is not obtained since coarse solid particles separate out after standing for a short time.

What is claimed is:

1. A process for the preparation of linear organopolysiloxanes having α, ω-terminal Si-bonded ω-alkenyl groups or α,ω-terminal Si-bonded hydrogen atoms of the general formula $$XR_2SiO(R_2SiO)_x - B_p - R_2Si - [R^3 - R_2SiO(R_2SiO)_x - B_p - R_2Si]_2X \quad (I)$$

by reacting Si-bonded ω-alkenyl group-containing organopolysiloxanes of the general formula $$R^1R_2SiO(R_2SiO)_m - R_2SiR^1 \quad (II)$$

with Si-bonded hydrogen atom-containing organopolysiloxanes having the general formula $$R^2R_2SiO(R_2SiO)_o - B_p - R_2SiR^2 \quad (III)$$

in the presence of catalysts promoting the addition of Si-bonded hydrogen at an aliphatic multiple bond, where R is an optionally substituted hydrocarbon radical having 1 to 18 carbon atom(s) per radical, X are each a radical $R^1$ or are each a radical $R^2$, $R^1$ is an ω-alkenyl radical having 2 to 18 C atoms, $R^2$ is a hydrogen atom, $R^3$ is a bifunctional α,ω-alkanediyl radical having 2 to 18 C atoms, and B is a radical of the formula

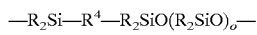

where $R^4$ is a divalent hydrocarbon radical having 2 to 14 carbon atoms per radical, which may be interrupted by 1 to 4 non-adjacent oxygen atoms, m is an integer having a value of 10 to 1000, o is an integer having a value of 10 to 1000, p is 0 or an integer having a value of 1 to 20, x is m or o, and z is an integer having a value of at least 2.

2. The process of claim 1, wherein X is $R^1$.

3. The process of claim 1, wherein X is vinyl.

4. The process of claim 1, wherein X is $R^2$.

5. The process of claim 1, wherein the ratio of Si-bonded ω-alkenyl groups in organopolysiloxanes of the formula (II) to Si-bonded hydrogen atoms in organopolysiloxanes of the formula (III) is 100:1 to 1:100.

6. The process of claim 2, wherein the ratio of Si-bonded ω-alkenyl groups in organopolysiloxanes of the formula (II) to Si-bonded hydrogen atoms in organopolysiloxanes of the formula (III) is 100:1 to 1:100.

7. The process of claim 3, wherein the ratio of Si-bonded ω-alkenyl groups in organopolysiloxanes of the formula (II) to Si-bonded hydrogen atoms in organopolysiloxanes of the formula (III) is 100:1 to 1:100.

8. The process of claim 4, wherein the ratio of Si-bonded ω-alkenyl groups in organopolysiloxanes of the formula (II) to Si-bonded hydrogen atoms in organopolysiloxanes of the formula (III) is 100:1 to 1:100.

9. The process of claim 1, wherein p is 0.

10. The process of claim 2, wherein p is 0.

11. The process of claim 3, wherein p is 0.

12. The process of claim 4, wherein p is 0.

13. The process of claim 5, wherein p is 0.

14. The process of claim 1 wherein said process of reacting takes place in the oil phase of an oil-in-water emulsion.

15. The process of claim 14 wherein the viscosity of the product of said reacting has a neat viscosity of from 100,000 to 20,000,000 $mm^2$/s at 25° C.

16. A method for treating surfaces, said method comprising applying to a surface an organopolysiloxane prepared by the process of claim 1.

17. A method for treating surfaces, said method comprising applying to a surface an organopolysiloxane prepared by the process of claim 2.

18. A method for treating surfaces, said method comprising applying to a surface an organopolysiloxane prepared by the process of claim 3.

19. A method for treating surfaces, said method comprising applying to a surface an organopolysiloxane prepared by the process of claim 4.

20. A method for treating surfaces, said method comprising applying to a surface an organopolysiloxane prepared by the process of claim 5.

21. A method for treating surfaces, said method comprising applying to a surface an organopolysiloxane prepared by the process of claim 6.

* * * * *

UNITED STATES PATENT AND TRADEMARK OFFICE
CERTIFICATE OF CORRECTION

PATENT NO. : 6,252,100 B1
DATED : June 26, 2001
INVENTOR(S) : Christian Herzig et al.

It is certified that error appears in the above-identified patent and that said Letters Patent is hereby corrected as shown below:

Column 8, claim 1,
Line 55, delete "$XR_2SiO(R_2SiO)_X-B_P-R_2Si-[R^3-R_2SiO(R_2SiO)_X-B_P-R_2Si]_2X$  (I)" and insert -- $XR_2SiO(R_2SiO)_X-B_P-R_2Si-[R^3-R_2SiO(R_2SiO)_X-B_P-R_2Si]_ZX$  (I) --

Signed and Sealed this

Fourth Day of December, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,252,100 B1
DATED : June 26, 2001
INVENTOR(S) : Christian Herzig et al.

It is certified that error appears in the above-identified patent and that said Letters Patent is hereby corrected as shown below:

<u>Title page,</u>
Item [54], in the Title: "ORGANOPOLYSILEANES" and insert therefor -- ORGANOPOLYSILOXANES --.

Signed and Sealed this

Sixth Day of August, 2002

Attest:

JAMES E. ROGAN
Attesting Officer     *Director of the United States Patent and Trademark Office*